(12) United States Patent
Milicevic et al.

(10) Patent No.: US 9,266,767 B2
(45) Date of Patent: Feb. 23, 2016

(54) PCVD METHOD FOR MANUFACTURING A PRIMARY PREFORM FOR OPTICAL FIBERS

(71) Applicant: Draka Comteq B.V., Amsterdam (NL)

(72) Inventors: Igor Milicevic, Helmond (NL); Mattheus Jacobus Nicolaas Van Stralen, Tilburg (NL); Johannes Antoon Hartsuiker, Eindhoven (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 14/258,430

(22) Filed: Apr. 22, 2014

(65) Prior Publication Data

US 2014/0322456 A1   Oct. 30, 2014

(30) Foreign Application Priority Data

Apr. 26, 2013 (NL) ...................................... 2010724

(51) Int. Cl.
*H05H 1/24* (2006.01)
*H05H 1/46* (2006.01)
*C03B 37/018* (2006.01)

(52) U.S. Cl.
CPC ....... *C03B 37/0183* (2013.01); *C03B 37/01807* (2013.01); *C03B 37/01823* (2013.01); *C03B 37/01869* (2013.01); *C03B 2201/31* (2013.01); *C03B 2207/28* (2013.01); *C03B 2207/70* (2013.01); *C03B 2207/80* (2013.01)

(58) Field of Classification Search
CPC ..................... C03B 37/0183; C03B 37/01869; C03B 2201/31; C03B 2207/28
USPC .................................. 427/575, 569, 230, 237
See application file for complete search history.

(56) References Cited

U.S. PATENT DOCUMENTS

| | | | |
|---|---|---|---|
| 4,314,833 A | | 2/1982 | Kuppers |
| 2003/0128955 A1* | | 7/2003 | Allan ................ C03B 37/01413 385/142 |
| 2011/0247369 A1* | | 10/2011 | Milicevic et al. ............... 65/391 |

FOREIGN PATENT DOCUMENTS

| | | |
|---|---|---|
| EP | 2008978 A | 12/2008 |
| WO | 99/35304 A1 | 7/1999 |

OTHER PUBLICATIONS

Dutch Search Report dated Oct. 29, 2013 for NL Patent Application No. 2010724.

* cited by examiner

*Primary Examiner* — Kelly M Gambetta
(74) *Attorney, Agent, or Firm* — Shumaker, Loop & Kendrick, LLP (57) ABSTRACT

A method for manufacturing a primary preform including providing a hollow substrate tube, supplying to the interior of the tube a main gas flow containing at least one glass-forming gas and at least one secondary gas flow containing at least one precursor for a dopant, creating a plasma reaction zone in the interior of the tube to effect deposition, and interrupting the supply of the at least one secondary gas flow near the reversal points of the supply and discharge sides of the substrate tube.

16 Claims, 3 Drawing Sheets

FIG. 3

PCVD METHOD FOR MANUFACTURING A PRIMARY PREFORM FOR OPTICAL FIBERS

CROSS-REFERENCE TO RELATED APPLICATION

This Application claims priority from Dutch Patent Application No. 2010724 filed Apr. 26, 2013, the contents of which are incorporated herein by reference.

TECHNICAL FIELD AND BACKGROUND OF THE INVENTION

The present invention relates to a method for manufacturing a primary preform for optical fibres by means of an internal plasma chemical vapor deposition (PCVD) process, the method including the steps of: i) providing a hollow glass substrate tube having a supply side and a discharge side; ii) supplying a gas flow in the interior of the hollow substrate tube via the supply side thereof, the gas flow including a main gas flow including at least one glass-forming gas and at least one secondary gas flow including at least one precursor for a dopant; iii) creating a plasma reaction zone in the interior of the hollow substrate tube by means of microwave radiation for effecting the deposition of glass layers on the inner surface of the hollow substrate tube, the reaction zone being moved back and forth along the longitudinal axis of the hollow substrate tube between a reversal point located near the supply side and a reversal point located near the discharge side of the hollow substrate tube, to obtain a substrate tube having glass layers deposited on its inner surface, and; iv) optionally subjecting the substrate tube having glass layers deposited on its inner surface obtained in step iii) to a collapsing treatment so as to form a solid primary preform.

The present invention relates generally to the field of optical fibres, and more particularly, to the field of manufacturing optical fibres by means of chemical vapour deposition. There are several types of chemical vapour deposition (CVD) known, such as outside vapour deposition (OVD), vapour axial deposition (VAD), modified chemical vapour deposition (MDVD) and plasma-enhanced chemical vapour deposition (PECVD or PCVD). Plasma-enhanced chemical vapour deposition (PECVD or PCVD) is a process used to deposit thin films from a gas state (vapour) to a solid state on a substrate. Chemical reactions are involved in the process, which occur after creation of a plasma of the reacting gases.

Generally, in the field of optical fibres, multiple thin films of glass are deposited on the inside surface of a substrate tube. The substrate tube is hollow to allow internal deposition. The substrate tube may be glass, preferably glass quartz ($SiO_2$). Glass-forming gases (i.e., reactive gases including gasses for the forming of glass and optionally precursors to dopants) are introduced into the interior of the substrate tube from one end (called the "supply side" of the substrate tube). Doped or undoped glass layers (depending on the use of reactive gases with or without one or more precursors to dopants, respectively) are deposited onto the interior surface of the substrate tube. The remaining gases are discharged or removed from the other end of the substrate tube called the "discharge side" of the substrate tube. The removal is optionally carried out by means of a vacuum pump. The vacuum pump has the effect of generating a reduced pressure in the interior of the substrate tube, the reduced pressure generally having a pressure value ranging between 5 and 50 mbar.

Generally, the plasma is induced by the use of microwaves. Generally, microwaves from a microwave generator are directed towards an applicator via a waveguide, wherein the applicator surrounds the substrate tube. The applicator couples the high-frequency energy into a plasma that is generated inside the substrate tube. The applicator is moved reciprocally in the longitudinal direction of the substrate tube. Thus, the plasma formed, also called the "plasma reaction zone," is also moved reciprocally. As a result of this movement, a thin glass layer is deposited onto the interior of the substrate tube with every stroke or pass.

Thus, the applicator is moved in translation over the length of the substrate tube within the boundaries of a furnace that surrounds the substrate tube and the applicator reciprocating within the furnace. With this translational movement of the applicator the plasma also moves in the same direction. As the applicator reaches the inner wall of the furnace near one end of the substrate tube, the movement of the applicator is reversed so that it moves to the other end of the substrate tube towards the other inner wall of the furnace. The applicator, and thus the plasma, travels in back and forth movement along the length of the substrate tube. Each back and forth movement is call a "'pass" or "stroke". With each pass a thin layer of glass material is deposited on the inside of the substrate tube.

This plasma causes the reaction of the glass-forming gases (e.g. $O_2$, $SiCl_4$ and e.g. a precursor for a dopant, such as $GeCl_4$ or other gases) that are supplied to the inside of the substrate tube. The reaction of the glass-forming gases allows reaction of Si (Silicon), O (Oxygen) and e.g. the dopant Ge (Germanium) so as to thus effect direct deposition of, for example, Ge-doped SiOx on the inner surface of the substrate tube.

Normally, a plasma is generated only in a part of the substrate tube, i.e., the part that is surrounded by the microwave applicator. The dimensions of the microwave applicator are smaller than the dimensions of the furnace and of the substrate tube. Only at the position of the plasma are the reactive gasses converted into solid glass and deposited on the inside surface of the substrate tube. Since the plasma reaction zone moves along the length of the substrate tube, glass is deposited more or less evenly along the length of the substrate tube.

When the number of passes increases, the cumulative thickness of these thin films, i.e. of the deposited material, increases, thus leading to a decrease in the remaining internal diameter of the substrate tube. In other words, the hollow space inside the substrate decreases with each pass.

The applicator and the substrate tube are generally surrounded by a furnace so as to maintain the substrate tube at a temperature between 900-1300° C. during the deposition process.

After the glass layers have been deposited onto the interior of the glass substrate tube, the glass substrate tube is subsequently contracted by heating into a solid rod ("collapsing"). The remaining solid rod is called a "primary preform." In a particular embodiment, the solid rod or primary preform may furthermore be externally provided with an additional amount of glass, for example by means of an external vapour deposition process or direct glass overcladding (so-called "overcladding") or by using one or more preformed glass tubes (so-called "sleeving"), thus obtaining a composite preform called the "final preform." From the final preform thus produced, one end of which is heated, optical fibres are obtained by drawing on a drawing tower. The refractive index profile of the consolidated (final) preform corresponds to the refractive index profile of the optical fibre drawn from such a preform.

One way of manufacturing an optical preform by means of a PCVD process is known from U.S. Pat. No. 4,314,833 in the name of the present applicant. According to the process that is known from that document, one or more doped or undoped glass layers are deposited onto the interior of a substrate tube, using a low-pressure plasma in the glass substrate tube.

According to International application WO 99/35304 in the name of the present applicant, microwaves from a microwave generator are directed towards an applicator via a waveguide, which applicator surrounds a glass substrate tube. The applicator couples the high-frequency energy into the plasma.

The inventors have observed that these prior art PCVD processes lead to the deposition of soot (manifested as an opaque ring on the inner surface of the hollow substrate tube called "soot ring") at the supply side of the primary preform. At the discharge side of the primary preform an area is observed having a higher doped silica, which is prone to cracking. Without wishing to be bound to any particular theory, it is assumed that such soot deposition takes place as a result of the relatively low intensity of the plasma in the region where the soot deposition takes place. It is further assumed that the temperature on the inner surface of the hollow substrate tube at the reversal points plays an important part in the formation of such a soot ring. The presence of such a soot ring has an adverse effect on the effective length of the preform. After all, the region of the soot ring in the substrate tube cannot be used for forming an optical fibre therefrom which meets the product specifications. Another drawback of the soot deposition is that there is a significant risk of fracture of glass layers, which means a loss of the total preform rod, which is undesirable.

Layer cracking is attributed to the fact that a high stress level will cause fracture at the location of any irregularities in the glass, which irregularities occur in particular in soot rings.

Since the current commercial trend in manufacturing of optical fibre preforms tends to go towards larger (thicker preforms), more passes or strokes will be required. This leads to tubes after deposition (before collapsing) having an even smaller internal diameter and even thicker soot ring. The problem of cracking, particularly in the vicinity of the supply side of the substrate tube is becoming more and more pressing.

This problem has been recognized previously and in the prior art several solutions have been proposed. Some of these solutions are discussed below.

One solution involves increasing the temperature of the PCVD furnace for subsequent depositions at either the supply side or the discharge side or both (depending on where the cracking occurs), when cracking is observed in the region of the soot ring during the collapsing treatment. This increase in temperature only partly addresses the problem. There are limits to the amount of temperature increase and the temperature difference between the middle part of the PCVD furnace and one or both ends (supply and/or discharge side).

Another solution is proposed in EP 1 988 064 from the present inventors. This document relates to the axial variation of the reversal point(s) during different phases (passes) of the glass deposition. In other words, the deposition of the soot ring is spread out over a larger area and hence the chance of cracking is reduced. For each phase of the deposition process (e.g. for the deposition of the core and for the deposition of the cladding), the reversal points at the supply side are moved, thereby providing a different placement of the soot ring. This method is effective, but could lead to a number of adjacent soot rings which may decrease the effective length of the preform.

Yet another solution is proposed in EP 1 801 081 by the present inventors. The solution involves the use of a so-called "insertion tube," being a tube that is inserted at the supply side of the substrate tube inside of the hollow substrate tube. The effect is that the soot is partly deposited inside of the insertion tube and can easily be removed by the removal of the insertion tube. This method is very useful, but in some cases might lead to so-called "deposition oscillation," which is undesirable.

Yet another solution is proposed in EP 2 008 978 by the present inventors. This method applies an etching step between two separate phases, during which etching step any non-uniformities are removed from the substrate tube. Even though this document discloses the interruption of the deposition process, the method according to EP 2 008 879 is different from the present invention. The etching is carried out by an etching gas. This method is very useful in a large number of applications. However, for the mere removal of a soot ring this method is labor intensive and costly.

Therefore, there is a need for an alternative solution to the problem discussed above.

BRIEF SUMMARY OF THE INVENTION

It is an object of the invention to provide a method for manufacturing a preform for optical fibres, in which the occurrence of undesirable fracture of glass layers is minimized.

It is another object of the invention to provide a method of manufacturing a preform for optical fibres by which a preform having a maximum effective preform length for drawing optical fibres therefrom is obtained.

It is another object of the invention to provide a method of manufacturing a preform for optical fibres by which a preform having a maximum thickness for drawing optical fibres therefrom is obtained with less chance of cracking.

To achieve the foregoing and other objects, provided herein is a method for manufacturing a primary preform for optical fibres by means of an internal plasma chemical vapour deposition (PCVD) process, wherein the method includes the steps of:

i) providing a hollow glass substrate tube having a supply side and a discharge side;

ii) supplying a gas flow in the interior of the hollow substrate tube via the supply side thereof, the gas flow comprising a main gas flow comprising at least one glass-forming gas and at least one secondary gas flow comprising at least one precursor for a dopant;

iii) creating a plasma reaction zone in the interior of the hollow substrate tube by means of microwave radiation for effecting the deposition of glass layers on the inner surface of said hollow substrate tube, the reaction zone being moved back and forth along the longitudinal axis of the hollow substrate tube between a reversal point located near the supply side and a reversal point located near the discharge side of the hollow substrate tube, to obtain a substrate tube having glass layers deposited on its inner surface; and iv) optionally subjecting the substrate tube having glass layers deposited on its inner surface obtained in step iii) to a collapsing treatment so as to form a solid primary preform;

wherein the supply of the at least one secondary gas flow is interrupted during step iii) when the plasma reaction zone is located near the reversal point located near the supply side and/or the reversal point located near the discharge side.

In a further embodiment, the precursor for a dopant present in the secondary gas flow is germanium or boron, and is preferably germanium (e.g. in the form of a dichloride or tetrachloride).

In a further embodiment, a second secondary gas flow is introduced in step ii) comprising fluorine as a precursor for a dopant.

In a further embodiment, the second secondary gas flow comprising fluorine is not interrupted.

In a further embodiment, the secondary gas flow is interrupted when the plasma reaction zone reaches an interruption point and is resumed when the plasma reaction zone reaches a resumption point. In other words, the secondary gas flow is interrupted between an interruption point and a resumption point.

In a further embodiment, the interruption point and/or the resumption point is between 20 and 100 millimeters from the reversal point, preferably between 30 and 60 millimeters, more preferable between 30 and 50 millimeters, and even more preferably between 35 and 45 millimeters. The interruption point is preferably at the same longitudinal location as the resumption point.

BRIEF DESCRIPTION OF THE DRAWINGS

The present invention is described below in detail with reference to the drawings in which.

DETAILED DESCRIPTION OF THE INVENTION

The following definitions are used in the present description and claims to define the stated subject matter. Other terms not cited below are meant to have their generally accepted meaning in the field.

The term "hollow substrate tube" as used herein means an elongated tube having a cavity within. Generally, the inside of the tube is provided (or coated) with a plurality of glass layers during the manufacturing of a preform.

The term "cavity" as used herein means the space surrounded by the wall of the substrate tube.

The term "gas supply side" or "supply side" as used herein means one side of the substrate tube, being an open end of the substrate tube that is used as the inlet for the gases. The supply side is the side opposite the discharge side.

The term "gas discharge side" or "discharge side" as used herein means one side of the substrate tube, being an open end of the substrate tube that is used as the outlet for the gases. The discharge side is the side opposite the supply side.

The term "inner surface" as used herein means the inside surface or interior surface of the hollow substrate tube.

The term "main gas flow" as used herein means the gas flow mainly comprising one or more glass-forming gases and one or more carrier gases without the presence of precursors for dopants (sometimes called undoped glass-forming gases). The flow rate of the main gas flow is preferably set at a substantially constant value during the deposition process and preferably has a substantially constant composition.

The term "secondary gas flow" as used herein means the gas flow mainly comprising one or more precursors for a dopant. The flow rate of the secondary gas flow may be interrupted during the deposition process or may be altered to provide the required results and required refractive index profile. More than one secondary gas flow may be present, each gas flow having an independent composition and independent flow rate.

The term "glass" or "glass material" as used herein means crystalline or vitreous (glassy) oxide material—e.g. silica ($SiO_2$) or quartz—deposited by means of a vapour deposition process.

The term "silica" as used herein means any substance in the form of $SiO_x$, whether or not stoichiometric, and whether or not crystalline or amorphous.

The term "glass-forming gases" as used herein means reactive gases used during the deposition process to form glass layers.

The term "glass-forming gases without precursors for a dopant" as used herein means gasses without intentionally added dopants that are able to react to essentially pure silica glass (e.g. a combination of $O_2$ and $SiCl_4$).

The term "carrier gas" as used herein means a gas that dilutes the concentration of glass-forming gas, without reacting directly with the glass-forming gas.

The term "precursor for a dopant" as used herein means a compound or composition that, when introduced into glass, become a dopant having an effect of the refractive index of the glass. Precursors for dopants may, for example, be gasses that react with one or more compounds in the glass-forming gasses to form doped glass layers when vitrified. During the glass deposition the precursor for a dopant is introduced into the glass layers.

The term "dopant" as used herein means a compound or composition that is present in the glass of the optical fibre and that has an effect of the refractive index of said glass. It can, for example, be a "down" dopant (i.e., a dopant for decreasing the refractive index, such as Fluorine or Boron (e.g. introduced as a precursor in the form of $F_2$, $C_2F_8SF_6$, $C_4F_8$ or $BCl_3$)). It can, for example, be an "up" dopant (i.e., a dopant for increasing the refractive index, such as Germanium (e.g. introduced as a precursor in the form of $GeCl_2$ (germanium dichloride) or $GeCl_4$ (germanium tetrachloride)). Dopants can be present in the glass either in the interstices of the glass (e.g. in the case of F) or they may be present as an oxide (e.g. in the case of Germanium, Aluminium, Phosphorus or Boron).

The term "soot" as used herein means a glassy substance produced by the incomplete vitrification of glass-forming compounds.

The term "soot deposition" as used herein means the deposition of soot particles on the inner walls of the substrate tube. Soot deposition is visible to the eye as a white, opaque glassy-like material. Sometimes called a "soot ring" or "soot collar."

The term "reaction zone" as used herein means the zone or axial location wherein the glass-forming reaction or deposition takes place. This zone is formed by a plasma and moves reciprocally along the longitudinal length of the substrate tube.

The term "plasma" as used herein means an ionized gas containing positive ions and free electrons in proportions resulting in more or less no overall electrical charge at very high temperatures. The plasma is usually induced by microwaves.

The term "reversal point" as used herein means the axial point or position on the substrate tube at which the movement of the applicator reciprocates. In other words, changes from back to forth and forth to back. It is the turning point of the applicator.

The term "near the reversal point" as used herein means an axial position on the substrate tube that is close in distance to the reversal point or is the same position as the reversal point.

The term "at the reversal point" as used herein means an axial position on the substrate tube that is the same position as the reversal point.

The term "moved back and forth" as used herein means a reciprocating movement or moving backwards and forwards in a straight line.

The term "phase" as used herein means a part of the deposition process in which glass layers having a specific refractive index value are deposited. The specific value may be constant or exhibit a gradient. For example, for a simple step index fibre the deposition of the core and the deposition of the cladding are each considered a separate phase.

The term "stroke" or "pass" as used herein means each back and forth movement of the applicator along the length of the substrate tube.

The term "cracking" or "fracturing" as used herein means the formation of cracks or fractures in the preform. Generally, the cracks or fractures occur between deposited glass layers. The cracking or fracturing may lead to breakage of the preform which could lead to a total loss of the preform.

The term "interruption" as used herein means stopping the gas flow during a certain period of time or over a certain longitudinal position of the applicator.

The term "point of interruption" or "interruption point" as used herein means the longitudinal position on the substrate tube at which the interruption starts. This is measured with respect to the reversal points. The specific axial position of the reversal point is not critical. Of particular importance is the spatial distance between the point of interruption and the reversal point.

The term "point of resumption" or "resumption point" as used herein means the longitudinal position on the substrate tube at which the interruption ends and the gas flow starts again. In an exemplary embodiment, the point of interruption and the point of resumption are at the same longitudinal position on the substrate tube. This is measured with respect to the reversal points. Of particular importance is the spatial distance between the point of resumption and the reversal point. The specific axial position of the reversal point is less important for the effect of the present invention.

In an exemplary embodiment, "deposition" can be regarded as comprising a number of separate "phases". Each of these phases has an initial refractive index value and a final refractive index value. Each of these phases comprises the deposition of a number of glass layers on the inside of the hollow substrate tube during a certain time period.

Figure 1:
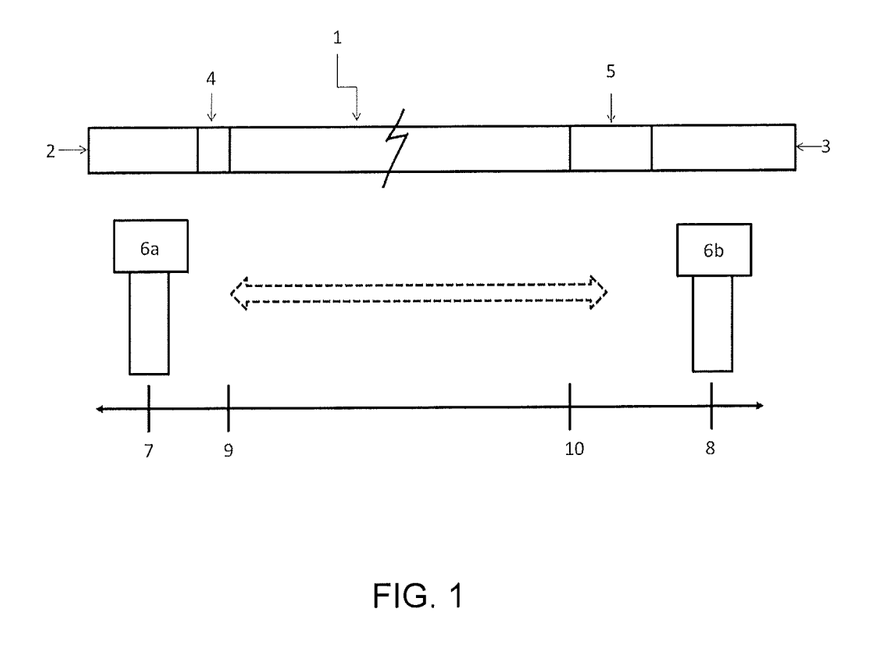
FIG. 1 shows a schematic view of a substrate tube and the movement of the applicator.
Figure 2:
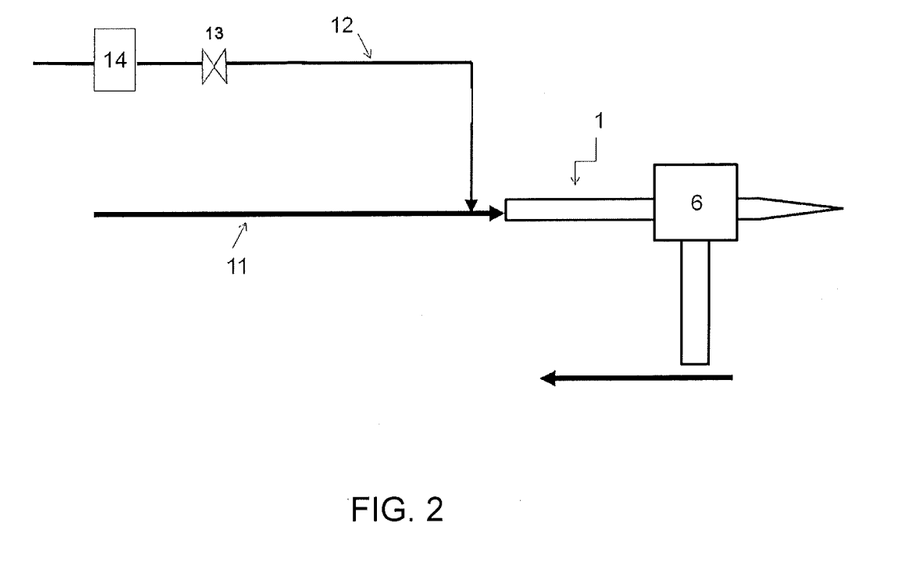
FIG. 2 shows a schematic view of the set up used in the present invention.

According to one embodiment, provided herein is a method for manufacturing a primary preform for optical fibres by means of an internal plasma chemical vapour deposition (PCVD) process. Referring to FIGS. 1 and 2, a hollow glass substrate tube 1 is provided having a supply side 2 and a discharge side 3. The hollow glass substrate tube 1 is used for the internal deposition of glass layers on the inner surface thereof. Referring to FIG. 2, a main gas line 11 and at least one secondary gas line 12 are attached to the supply side, and preferably, a vacuum pump is attached to the discharge side.

A gas flow is supplied into the interior of the hollow substrate tube 1. The gas flow is introduced via the supply side of the substrate tube. The gas flow includes a main gas flow and at least one secondary gas flow. The main gas flow mainly comprises at least one glass-forming gas, for example, oxygen and silicon tetrachloride. For example, there may be two secondary gas flows, with the first including at least one precursor for a dopant, such as germanium (e.g. in the form of germanium tetra- or dichloride), and the second including at least one precursor to a dopant, such as fluorine (e.g. in the form of $C_2F_6$).

A plasma reaction zone is created in the interior of the hollow substrate tube 1. The plasma is created by means of microwave radiation. This plasma reaction zone provides conditions suitable for effecting the deposition of glass layers on the inner surface of the hollow substrate tube by allowing the reaction of the glass-forming gases and optionally one or more precursors for dopants. In other words, the plasma reaction zone is the three dimensional space that is taken up by the plasma inside of the substrate tube. The present method includes interrupting the flow of precursors for a least one dopant during specific phases of the deposition process. During the largest part of the deposition process, i.e. during the largest part of each pass, at least one precursor for a dopant is present in the glass-forming gases.

During this step, the reaction zone is reciprocated between the two reversal points, each of which is located at or near the ends of the substrate tube, shown schematically in FIG. 1 for illustrative purposes. FIG. 1 shows a portion (i.e., the two ends) of the substrate tube 1. The applicator 6 (shown in positions 6a and 6b) provides the plasma. It should be noted that the applicator is present coaxially over the substrate tube, but for reasons of clarity the applicator has been shown separately from the substrate tube in this figure. FIG. 2 shows the applicator as present coaxially over the substrate tube. The plasma formed moves back and forth along the longitudinal axis of the hollow substrate tube together with the applicator. The position of the applicator on the reversal point 7 near the supply side is shown with reference number 6a and the position of the applicator on the reversal point 8 near the discharge side is shown with reference number 6b. Although shown in two separate positions for illustrative purposes, it should be understood that there is only one applicator. Movement is shown by the arrow from the supply side to the discharge side and back. The movement reciprocates between a reversal point located near the supply side and a reversal point located near the discharge side of the hollow substrate tube 1.

When moving from the discharge side to the supply side, at least one of the secondary gas flows is interrupted when the applicator reaches the interruption point 9. The applicator then continues to move towards the reversal point 7. The movement is reversed and the applicator starts moving away from the reversal point 7 towards the resumption point (in this case the same as interruption point 9). As soon as the applicator passes point 9 the secondary gas flow is resumed. The applicator continues to move towards the discharge side and the secondary gas flow is still flowing.

When moving further from the supply side to the discharge side, the secondary gas flow is optionally interrupted when the applicator reaches the interruption point 10 (if applicable in the specific embodiment). The applicator then continues to move towards the reversal point 8. The movement is reversed and the applicator starts moving away from the reversal point 8 towards the resumption point (in this case the same as interruption point 10). As soon as the applicator passes point 10 the secondary gas flow is resumed (if it were interrupted). The applicator continues to move again towards the supply side and a pass has been completed.

This reciprocation takes place a number of times (called passes or strokes) and during each pass or stroke a thin layer of glass is deposited. In case the deposition process is carried out in several phases, each phase may comprise a plurality of strokes, for example, between 1,000 and 10,000, more preferably between 2,000 and 4,000 strokes.

At the end of this step, a substrate tube having the desired number of glass layers deposited on its inner surface is obtained. At that moment, the deposition process is stopped. Thus, the microwaves are stopped as well as the main gas flow and any secondary gas flows.

In an optional step, the substrate tube may be subjected to a collapsing treatment to form a solid primary preform. This step may be required in applications requiring a solid primary preform. However, it is envisioned that collapsing may be carried out at a later time and/or at another facility. During the collapsing step, the hollow substrate tube is heated using an external heat source, for example a furnace or burners, to a temperature between 1800 and 2200 degrees C. In several strokes or collapsing passes the hollow tube is heated and collapses onto itself to form a solid rod.

In an optional step, an additional amount of glass may be applied to the exterior of the primary preform, for example by means of an external vapour deposition process or direct glass deposition process (i.e., "overcladding"), or by using one or more preformed glass tubes provided over the outside surface of the primary preform (i.e., "sleeving"), to obtain the final preform.

From the final preform, one end of which is heated, optical fibres are obtained by drawing on a drawing tower. The refractive index profile of the consolidated (collapsed) preform corresponds to the refractive index profile of the optical fibre drawn from such a preform.

The presence of dopants in the soot ring will increase the chances of cracking at the location of the soot ring. Without wanting to be bound to any particular theory, it is assumed that this has to do with the difference in the expansion coefficient between undoped and doped silica. Germanium oxide-doped silica has a much lower melting point and during the transport of the tube to the collapsing apparatus, the cooling of the different glasses at different rates causes stress. This stress or tension between the layers leads to cracking of the layers. The present inventors have found that this different heating and cooling behaviours mainly causes problems in the area where the soot ring is present. The soot ring already provides defects in the glass which, taken together with the different thermal behaviour of the layers, will lead to cracking.

The inventors assume, without wishing to be bound by any particular theory, that the relative low intensity of the plasma near the supply of the substrate tube, leading to a relatively low temperature of the inner surface of the supply side of the substrate tube is one of the main reasons that soot deposition and cracking occurs. At the discharge side there is an accumulation of doped glass leading to additional stress. The soot ring is shown in FIG. 1 at reference number 4, and the highly doped part is shown in FIG. 1 at reference number 5.

The substantially reduce or eliminate cracking, the method includes interrupting the supply of the at least one secondary gas flow during the deposition during the time when the plasma reaction zone is located between the interruption point (reference numbers 9 and 10 in FIG. 1) and the reversal points (reference numbers 7 and 8 in FIG. 1). One example of a set-up for implementing the method is shown in FIG. 2. FIG. 2 shows the supply side of the substrate tube 1 with the applicator 6 moving in the direction of the arrow. A main gas flow is shown at reference number 11, for which the gas tanks are not shown. A secondary gas flow is shown at reference number 12. The secondary gas flow comprises a valve 13, a mass flow controller 14, and a gas tank (not shown).

When the applicator is near the reversal point, located near the supply side and/or near the reversal point located near the discharge side, the valve 13 is closed. In other words, the flow of gas of the secondary gas flow is interrupted during the reversal motion or turning of the applicator.

In one embodiment, the precursor for a dopant of the secondary gas flow is germanium. The presence of germanium in the glass layers in the region of the soot ring has been found to increase the chances of cracking, which is highly undesirable.

In another embodiment, a second secondary gas flow is introduced in step ii) comprising fluorine as a precursor for a dopant. In certain or all phases of the deposition process, the presence of fluorine may be required in order to decrease the refractive index of this part of the hollow substrate tube.

In another embodiment, the second secondary gas flow comprising fluorine is not interrupted. It is not required that the second secondary gas flow is interrupted. However, it may be preferable depending on the situation, to interrupt both the gas flow of the first secondary gas flow and the second secondary gas flow.

In another embodiment, the secondary gas flow is interrupted when the plasma reaction zone (or the applicator) is between 20 and 60 millimeters from the reversal point, preferably between 30 and 50 millimeters from the reversal point. When measuring this distance, the front of the plasma reaction zone (the side of the plasma reaction zone closest to the reversal point) is taken as the starting point for the measurement. Thus, the distance between the front of the plasma reaction zone and the reversal point is measured.

Depending of the length of the substrate tube, the location of the soot ring may vary, hence there may also be variation in the distance from the reversal point at which the interruption starts. Depending on the speed of the applicator, the duration of the interruption may vary, but the above ranges have been found to be particularly beneficial. The timing or placement of the interruption is selected to fall in longitudinal position corresponding to the soot ring. In other words, the position of the applicator at the moment of the interruption of the secondary gas flow may be selected to coincide with the start of the soot ring.

In one embodiment, an additional gas line for the secondary gas flow may be attached to the supply side of the substrate tube. By means of a valve, e.g. a so called "fast valve," this gas line—for the supply of precursor dopant gas—is coupled to the supply system of glass-forming gasses. A fast valve is a valve that switches between an open position and close position in about 100 milliseconds or less. It may be introduced into the main gas flow before it enters the cavity of the substrate tube or it may be entered into the cavity of the substrate tube separately from the main gas flow.

Preferably, this valve is placed between the substrate tube and the mass flow controller (MFC) that is placed after the gas tank. A mass flow controller is a device used to measure and control the flow of gases. It is designed and calibrated to control a specific type of gas at a particular range of flow rates. The MFC can be given a set point from 0 to 100% of its full scale range, but is typically operated in the 10 to 90% of full scale where the best accuracy is achieved. The distance between the MFC and the valve is preferably sufficiently long so that the gas line in between the MFC and the valve may act as a buffer. In other words, when the valve is closed, the MFC does not notice any difference and the same amount of gas is still let through. This gas will build up inside of the line between the MFC and the valve. The volume of this line is called the buffer volume. After the valve is opened, the gas built up in the line is released. Thus, the interruption of the gas flow of the secondary gas will not lead to a decrease in the amount of secondary gas introduced, but will mainly lead to a difference in the addition profile. In other words, the flow rate fluctuates. Preferably, the length of line between the MFC and the valve is between 1 and 10 meters, preferably between 5 and 7 meters. This length is particularly useful with a line having a diameter of ½ inch (0.5").

In an embodiment, the present inventors have used a low pressure mass flow controller for germanium. This MFC is very sensitive for any pressure drop. In such a case a sufficient buffer volume is very important to prevent a pressure drop. If the buffer volume is too low, the MFC will be influenced, which is undesirable. If the volume is too large, the reaction of MFC will be too slow. For example, the buffer volume may be between 0.2 and 1.5 liter, preferably between 0.3 and 0.8 liter, such as between 0.4 and 0.6, or 0.5 liter.

The desired length of line to ensure adequate buffer capacity or buffer volume can be calculated based on the set point of the MFC, the size of the orifice of the valve, the duration that the valve is closed and the diameter of the line used.

The valve for supplying the plasma-reactive gas can be connected to an orifice having a certain opening size. The size of the opening has a direct influence on the pressure drop over the valve. For obtaining a low pressure drop, the Kv value of the orifice should be at least 0.022 ($m^3n/h$). The Kv value is the metric measure for the flow, defined as the volume flow in cubic meters per hour of water at a temperature of between 5° and 40° Celsius with a pressure drop across the valve of 1 bar.

The valve can optionally be coupled to a controller, for example a microcontroller, which measures the position of the applicator and controls the duration of the opening of the valve and in that way controlling the positions at which and the amount of gas introduced into the substrate tube.

In one embodiment, the interruption(s) is(are) provided during each pass. The interruptions may also occur according to a different protocol, for example, in which the valve closes during certain passes or during certain phases or opens at different locations or for different durations for different passes and/or phases.

In one embodiment, it is preferable if the substrate tube is fixed or clamped in position in the apparatus on both ends thereof and the applicator (and optionally also the furnace) is movable along the longitudinal axis of the substrate tube. Such a construction is particularly advantageous because the existing PCVD equipment can be adapted in a simple manner. It is also possible to rotate the substrate tube during the deposition process or externally flush with an inert gas so as to prevent deposition of furnace particles on the outer side of the substrate tube.

The applicator is preferably cylindrically symmetrical and annular in shape, comprising a cavity or resonator space that extends cylindrically symmetrically around the cylindrical axis and which is annular in shape, the resonator space having a slit that extends in a full circle around the cylindrical axis, the slit acting as a radial waveguide through which microwave energy is transported to the plasma. In principle, the slit can be as wide as the cavity itself or smaller.

Comparative Example

A substrate tube was provided into a lathe. A PCVD process was started using a mixture of $SiCl_4$, $C_2F_6$ and $O_2$ for the main gas flow, and $GeCl_4$ for the secondary gas flow. An applicator was moved reciprocally over the length of the substrate tube between a reversal point near the gas supply side of the substrate tube and a reversal point near the gas discharge side of the substrate tube. A plasma reaction zone was created in the tube at the position of the moving applicator, and about 10,000 passes were carried out without any interruption in the secondary gas flow. After collapsing the primary preform obtained, the maximum refractive index over the axial length of the primary preform was determined, and is shown as the solid line in FIG. 3.

Working Example

The method of the comparative example was modified such that the reversal point near the gas supply side was shifted 50 mm towards the gas supply, and the secondary gas flow was interrupted during each pass during the period of time between the applicator passing the interruption point (when moving towards the reversal point) and passing the resumption point (when moving away from the reversal point). The interruption point was located at 50 millimeters from the reversal point near the gas supply side and the resumption point 40 millimeters from the reversal point near the gas supply side. After collapsing the primary preform obtained according to the interruption method of the present invention, the refractive index was fitted using a standard alpha fitting, resulting in a fitted maximum refractive index for each axial position. The fitted maximum refractive index over the axial length of the primary preform is shown as the dashed line in FIG. 3.

Figure 3:
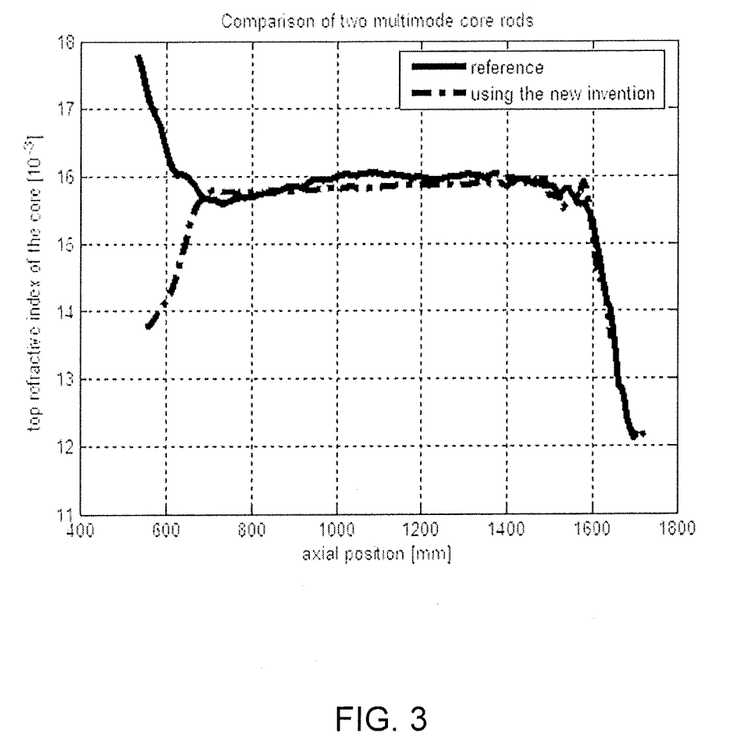
FIG. 3 shows a graph of the maximal refractive index versus the axial position for a primary preform according to the present invention and a prior art primary preform.

FIG. 3 thus depicts a graph showing two separate traces. The first trace (solid) is a reference trace wherein the method according to the present invention was not used. The second trace (dashed) is a trace according to the method of the present invention. The graph shows the fitted maximum refractive index of the core versus the axial (longitudinal) position along the length of the substrate tube.

It is clear from FIG. 3 that the refractive index is affected by the present method in the region of the reversal point near the supply side. Over a certain length the refractive index is substantially lower due to the interruption of the precursor for germanium doping. In the present case, the interruption and resumption points do not coincide with a point where the refractive index is back to the reference value. This is due to the fact that the built up precursor gas has to travel from the valve to the plasma reactive zone to be incorporated as a dopant into the glass and that the plasma reactive zone is about 250 mm wide. During the time that it takes to accomplish this, the plasma reactive zone has moved slightly towards the discharge side, thus providing the lag. It is noted that the qualification length (i.e., the length that complies with the requirements and is approved for further processing) of the primary preform thus obtained is identical to the qualification length obtained according the comparative example.

What is claimed is:

1. A method for minimizing occurrence of glass layer fracture while manufacturing a primary preform for optical fibres using an internal plasma chemical vapour deposition process, comprising the steps of:
   i) providing a hollow glass substrate tube having a supply side and a discharge side;
   ii) supplying a gas flow to the interior of the hollow glass substrate tube via the supply side, the gas flow comprising:
      a) a continuous main gas flow comprising at least one glass-forming gas and
      b) a first secondary gas flow comprising at least one precursor for a dopant, being germanium, aluminum, phosphorus, and boron;
   iii) creating a plasma reaction zone in the interior of the hollow glass substrate tube using microwave radiation for effecting the deposition of glass layers on the inner surface thereof, the reaction zone moving back and forth along the longitudinal axis of the hollow glass substrate tube between a reversal point located near the supply side and a reversal point located near the discharge side, to obtain a substrate tube having glass layers deposited on the inner surface; and
   iv) intermittently interrupting by reducing or shutting off the supply of the first secondary gas flow comprising the at least one precursor for the dopant, being germanium, aluminum, phosphorus, and boron during step iii) when the plasma reaction zone is located near or at the reversal point located near the supply side and/or near or at the reversal point located near the discharge side to reduce or prevent the incorporation of the at least one precursor for the dopant in the glass of the preform at the supply side and/or discharge side to minimize glass layer fracture in the preform at the supply side and/or at the discharge side.

2. The method according to claim 1, further comprising the step of collapsing the substrate tube to form a solid primary preform.

3. The method according to claim 1, wherein the precursor for the dopant is one of germanium tetrachloride and germanium dichloride.

4. The method according to claim 1, further comprising supplying a second secondary gas flow, wherein:
the first secondary gas flow is interrupted according to step iv) and the second secondary gas flow is not interrupted during step iv).

5. The method according to claim 4, wherein the first secondary gas flow containing the one or more of germanium, aluminum, phosphorus and boron is interrupted when the plasma reaction zone reaches an interruption point, and resumes when the plasma reaction zone reaches a resumption point.

6. The method according to claim 5, wherein the interruption point is from 20 to 100 millimeters from the reversal point.

7. The method according to claim 5, wherein the interruption point is from 30 to 60 millimeters from the reversal point.

8. The method according to claim 5, wherein the resumption point is from 20 to 100 millimeters from the reversal point.

9. The method according to claim 5, wherein the resumption point is from 30 to 60 millimeters from the reversal point.

10. A method of minimizing occurrence of glass layer fracture while manufacturing a primary preform for optical fibres using an internal plasma chemical vapour deposition process, comprising the steps of:
i) providing a hollow substrate tube having a supply side and a discharge side;
ii) supplying a gas flow to the interior of the hollow substrate tube via the supply side, the gas flow comprising:
a) a main gas flow comprising at least one glass-forming gas and
b) a first secondary gas flow comprising at least one precursor for a dopant, being germanium, aluminum, phosphorus, and boron:
iii) creating a plasma reaction zone in the interior of the hollow substrate tube using microwave radiation for effecting the deposition of glass layers on the inner surface thereof, the reaction zone moving back and forth along the longitudinal axis of the hollow substrate tube between a reversal point located near the supply side and a reversal point located near the discharge side, to obtain a substrate tube having glass layers deposited on the inner surface;
iv) intermittently interrupting by reducing or shutting off the supply of the first secondary gas flow comprising the at least one precursor for the dopant, being germanium, aluminum, phosphorus, and boron during step iii) when the plasma reaction zone passes an interruption point near each of the supply side and the discharge side; and
v) resuming the supply of the first secondary gas flow during step iii) when the plasma reaction zone passes a resumption point near each of the supply side and/or the discharge side to reduce or prevent the incorporation of the at least one precursor for the dopant in the glass of the reform at the supply side and/or discharge side to minimize glass layer fracture in the preform at the supply side and/or at the discharge side.

11. The method according to claim 10, wherein the interruption point and the resumption point are longitudinally aligned along the length of the hollow glass substrate tube.

12. The method according to claim 10, further comprising the step of collapsing the substrate tube to form a solid primary preform.

13. The method according to claim 10, wherein the precursor for the dopant is one of germanium tetrachloride and germanium dichloride.

14. The method according to claim 10, further comprising supplying a second secondary gas flow, wherein:
the first secondary gas flow is interrupted according to step iv) and the second secondary gas flow is not interrupted during step iv).

15. The method according to claim 10, wherein the interruption point is from 30 to 60 millimeters from the reversal point.

16. The method according to claim 10, wherein the resumption point is from 30 to 60 millimeters from the reversal point.

* * * * *